US009046739B2

(12) United States Patent
Spielberg

(10) Patent No.: US 9,046,739 B2
(45) Date of Patent: *Jun. 2, 2015

(54) DIGITAL IMAGE CAPTURE UNDER CONDITIONS OF VARYING LIGHT INTENSITY

(71) Applicant: International Business Machines Corporation, Armonk, NY (US)

(72) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/742,144

(22) Filed: Jan. 15, 2013

(65) Prior Publication Data

US 2014/0002719 A1    Jan. 2, 2014

Related U.S. Application Data

(63) Continuation of application No. 13/536,208, filed on Jun. 28, 2012.

(51) Int. Cl.
H04N 5/235 (2006.01)
G03B 9/64 (2006.01)

(52) U.S. Cl.
CPC ............... *G03B 9/64* (2013.01); *H04N 5/2351* (2013.01)

(58) Field of Classification Search
USPC ............................ 348/362–367, 226.1–228.1
See application file for complete search history.

(56) References Cited

U.S. PATENT DOCUMENTS

| 6,081,076 | A | 6/2000 | Ogawa | 315/241 |
| 6,379,022 | B1 | 4/2002 | Amerson et al. | 362/231 |
| 7,550,251 | B2 | 6/2009 | McLean et al. | 430/300 |
| 2006/0152598 | A1* | 7/2006 | Kawarada | 348/226.1 |
| 2009/0231468 | A1 | 9/2009 | Yasuda | 348/234 |

(Continued)

FOREIGN PATENT DOCUMENTS

| JP | 2005277957 A | 10/2005 | G03B 7/08 |
| JP | 2012004817 | 1/2012 | |

(Continued)

OTHER PUBLICATIONS

International Search Report and Written Opinion for PCT Application PCT/IB2013/055195, mailed Dec. 3, 2013, 6 pages.

(Continued)

*Primary Examiner* — Roberto Velez
*Assistant Examiner* — Yih-Sien Kao
(74) *Attorney, Agent, or Firm* — VanLeeuwen & VanLeeuwen; Damion C. Josephs

(57) ABSTRACT

An approach is provided to adjust a camera shutter lag. In the approach, data is collected that corresponds to an ambient light found in a physical environment with the ambient light being controlled using a pulse-width modulation (PWM). The pulse-width modulation corresponds to a PWM timing model. When an exposure request is received, the camera shutter lag is calculated using the PWM timing model. The calculated shutter lag is based on a future point in time at which the ambient light of the physical environment is predicted to be at a selected light output level, such as a power level selected by the user of a camera. When the calculated camera shutter lag has expired, a shutter of the camera is opened causing a camera lens to be exposed that results in a captured exposure.

10 Claims, 5 Drawing Sheets

(56) References Cited

U.S. PATENT DOCUMENTS

| | | | |
|---|---|---|---|
| 2009/0285573 A1 | 11/2009 | Aoyagi | 396/157 |
| 2010/0103310 A1 | 4/2010 | Lin et al. | 348/366 |
| 2010/0124041 A1 | 5/2010 | Druchinin | 362/16 |
| 2010/0189429 A1 | 7/2010 | Butterworth | 396/155 |
| 2010/0254692 A1 | 10/2010 | Kurt et al. | 396/155 |
| 2010/0302447 A1 | 12/2010 | Shirai | 348/607 |

FOREIGN PATENT DOCUMENTS

| | | | | |
|---|---|---|---|---|
| JP | 2012175610 | | 9/2012 | |
| JP | 2012175610 A | * | 9/2012 | |
| WO | WO2009108050 A1 | | 9/2009 | G06T 5/50 |
| WO | 2011081817 | | 7/2011 | |
| WO | WO 2011081817 A2 | * | 7/2011 | |

OTHER PUBLICATIONS

Borman, S.-et al.; "Image Sequence Processing"; Dept of Electrical Engineering; University of Notre Dame; Oct. 14, 2002, 81 pages.

Rand, G-et al.; "Working Within Exposure Limits in Digital Photography"; Brooks Institute of Photography; www.sekonic,com/news/review2asp; 2011, 4 pages.

Mayes, JE.-et al.; "High Speed Image Capture for Mechanical Analysis"; IP.COM/IPCOM000080397D; Prior Art Database; Feb. 27, 2005, 4 pages.

* cited by examiner

DIGITAL IMAGE CAPTURE UNDER CONDITIONS OF VARYING LIGHT INTENSITY

TECHNICAL FIELD

The present disclosure relates to an approach that captures digital images in an environment where pulse-width-modulation (PWM) is used to dim ambient light.

BACKGROUND OF THE INVENTION

Traditional devices for architectural lighting (e.g., indoor residential lighting, commercial lighting, theatrical stage lighting, etc.) use hot tungsten filaments as the light-emitting source. Such devices are commonly being replaced with ones that use newer technology, in which the hot tungsten filament is replaced by a light emitter which is more energy-efficient, or offers more flexibility in features and performance, or both. One such technology gaining rapid adoption is LED (Light-Emitting Diode) lighting. While offering advantages over tungsten lighting as a light source for human vision, LED lights pose significant challenges for digital image capture, both in still photography and in videography. Among these challenges is the variation in light intensity with LED-based lighting.

A common technique for dimming LED lights is the use of pulse-width modulation (PWM.) When PWM is used to dim an LED light, its effect is to cause the LED to cycle between full light output and zero light output. This cycling between "full on" and "full off" is done at a frequency high enough to be invisible to the human eye, and is perceived by humans as a reduction in light intensity where the light appears to be dimmed. However, such cycling can be captured by modern digital imaging systems that use a shutter to define specific exposure periods with the exposure periods typically being a small fraction of a second. For example, when an LED light is dimmed using PWM such that it is cycling between "full on" and "full off" 100 times per second: 5 ms on, then 5 ms off, then 5 ms on, etc. If a digital camera is used to capture a photo using a shutter speed of 1/1000 s (1 ms), then depending on the exact time the shutter is tripped, the exposure might be made during a period when the LED is on, or a period when the LED is off. These two cases would result in very different exposures. This phenomenon imposes limits on shutter speed which can be used when doing still photography or videography under LED lighting. Depending on the specific circumstances, such limitations can be inconvenient, or they can be insurmountable obstacles to good image capture. Example: if one is photographing sports, a relatively high shutter speed (e.g., 1/1000 s) is required to "freeze" subject motion. If the above-described phenomenon imposes a relatively low limit on the shutter speed which can be used (e.g., 1/100 s), then producing high-quality action photographs will be impossible.

SUMMARY

An approach is provided to adjust a camera shutter lag. In the approach, data is collected that corresponds to an ambient light found in a physical environment with the ambient light being controlled (e.g., dimmed, etc.) using pulse-width modulation (PWM). The pulse-width modulation corresponds to a PWM timing model. When an exposure request is received, a camera shutter lag is calculated using the PWM timing model. The calculated shutter lag is based on a future point in time at which the ambient light of the physical environment is predicted to be at a selected light output level, such as a power level selected by the user of a camera. When the calculated camera shutter lag has expired, a shutter of the camera is opened causing a photosensitive sensor to be exposed that results in a captured exposure.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
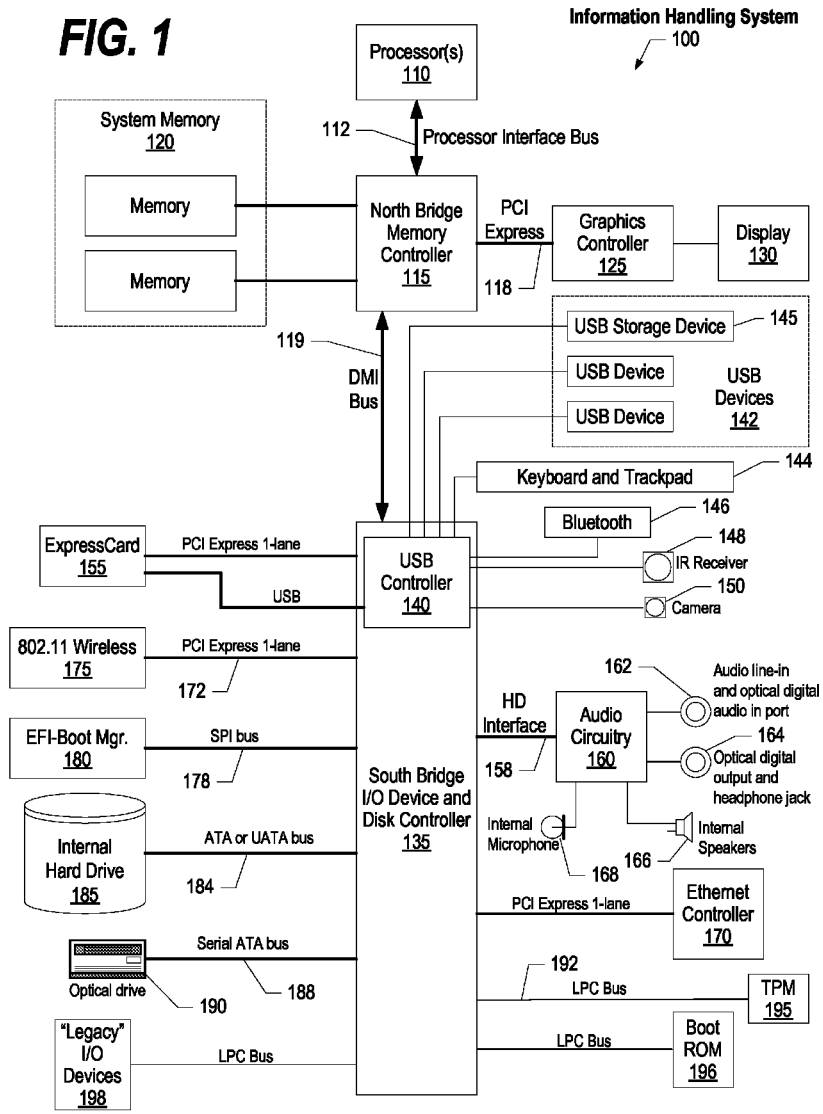
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a hand-held or stationary camera, or a digital single-lens reflex camera (dSLR).

Figure 2:
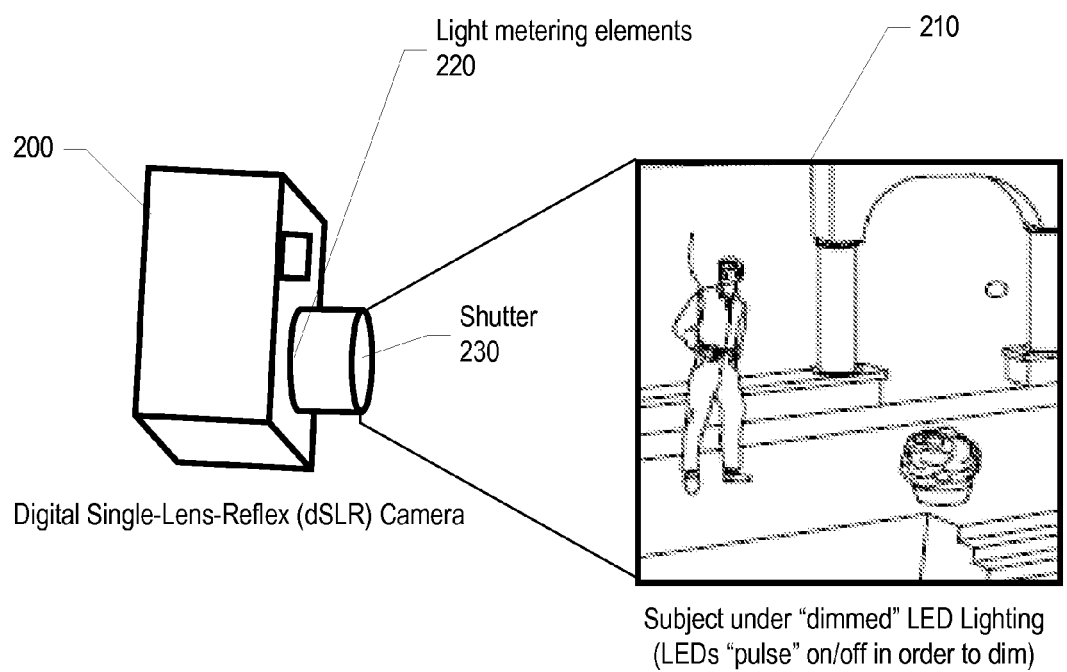
FIG. 2 is a diagram of a camera capturing an image of a subject in an environment where LED "pulsed" lighting is utilized.

FIG. 2 is a diagram of a camera capturing an image of a subject in an environment where LED "pulsed" lighting is utilized. Digital single-lens reflex camera (dSLR) 200 captures images of a subject in a physical environment that has ambient light controlled (e.g., dimmed, etc.) using pulse-width modulation (PWM). As used herein, PWM includes traditional pulse-width modulation as well as other modulation techniques (e.g., binary code modulation, etc.) used to dim or control lights by rapidly turning the lights on and off to create the light intensity. Also, as used herein, "ambient light" refers to any available light source, such as room lighting, or theatrical stage lighting, that is not controlled by the user. For example, the light produced by the camera's flash unit would not be "ambient light." The camera collects data corresponding to the ambient light and creates a pulse-width modulation timing model that describes the intensity of light as a function of time (see, e.g., FIG. 4, graph 460 for an example of how a PWM timing model might appear). In one embodiment, dSLR camera 200 includes photosensitive array of light metering elements 220 located behind shutter 230. As used herein, "shutter" includes any mechanism by which the timing and duration of the exposure of a photosensitive sensor is controlled, including but not limited to mechanical devices and electronic control circuits. For ease of description, the following discussion is written in words descriptive of mechanical shutters, but those skilled in the art will recognize the applicability of these concepts to other methods of controlling the exposure of photosensitive sensors. Shutter 230 can be opened to allow ambient light 210 to reach photosensitive array of light metering elements 220. dSLR 200 includes a processor (see, e.g., processor 100 shown in FIG. 1) that controls the shutter and collects the ambient light data by sampling the ambient light that reaches the photosensitive array of light metering elements. The sample is then used to create the PWM timing model, such as the model shown in FIG. 4, element 460.

Figure 5:
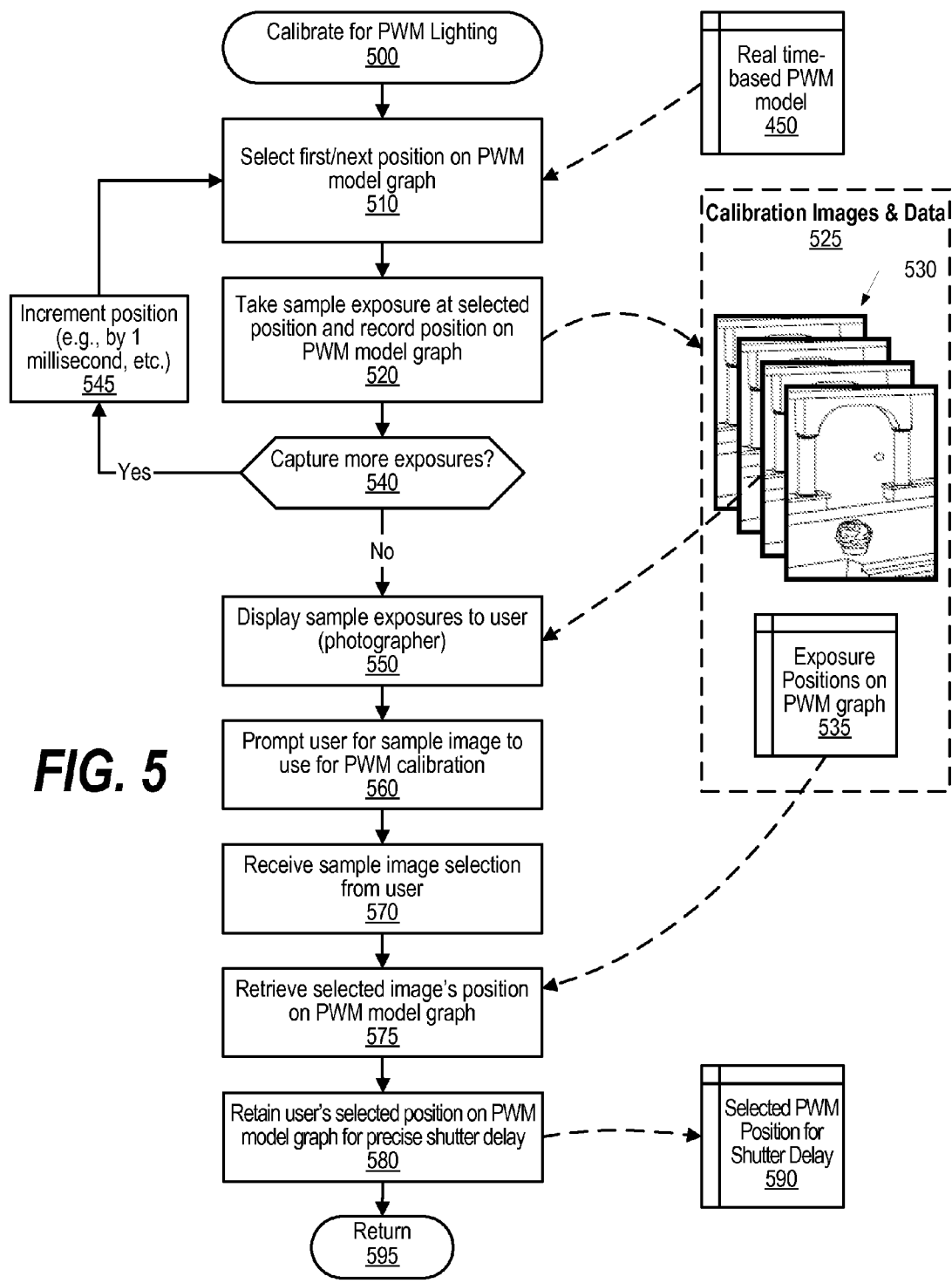
FIG. 5 is a flowchart showing steps performed to calibrate the camera based on the lighting conditions.

After the PWM timing model has been created, the user (e.g., a photographer, automated process, etc.) of the dSLR issues a request to capture an exposure of subject 210. The camera shutter lag is calculated, using the PWM timing model created as described above, based on a future point in time at which the ambient light of the physical environment is predicted to be at a selected light output level. The selected light output level depends on the characteristics of the image that the user wishes to capture. In one embodiment, a calibration is taken as shown in FIG. 5. During calibration, multiple exposures are taken of a sample object with the various exposures being taken at different points of the PWM timing model. The user then selects one of the sample images corresponding to the desired image characteristics.

For example, the user may select a sample image that falls a half-millisecond past the beginning of a high signal segment of the PWM timing model. When an actual image is taken, the calculation will identify a shutter lag that makes the shutter open when the ambient light conditions are predicted to again be a half-millisecond past the beginning of the high signal segment of the PWM model. In this manner, the actual exposures taken by the user generally have the same PWM lighting conditions as the calibration sample selected by the user. Other techniques are provided for "high light" and "low light" auto-settings. In the "high light" automatic setting, the user simply selects that a "high light" is desired when PWM ambient lighting is detected. The "high light" setting results in the selected light output level being set to a beginning point of an upcoming high signal segment of the PWM timing model. Likewise, a "low light" automatic setting is also provided that can be selected by the user with the user selecting that a "low light" is desired when PWM ambient lighting is detected. The "low light" setting results in the selected light output level being set to a beginning point of an upcoming low signal segment of the PWM timing model.

Figure 3:
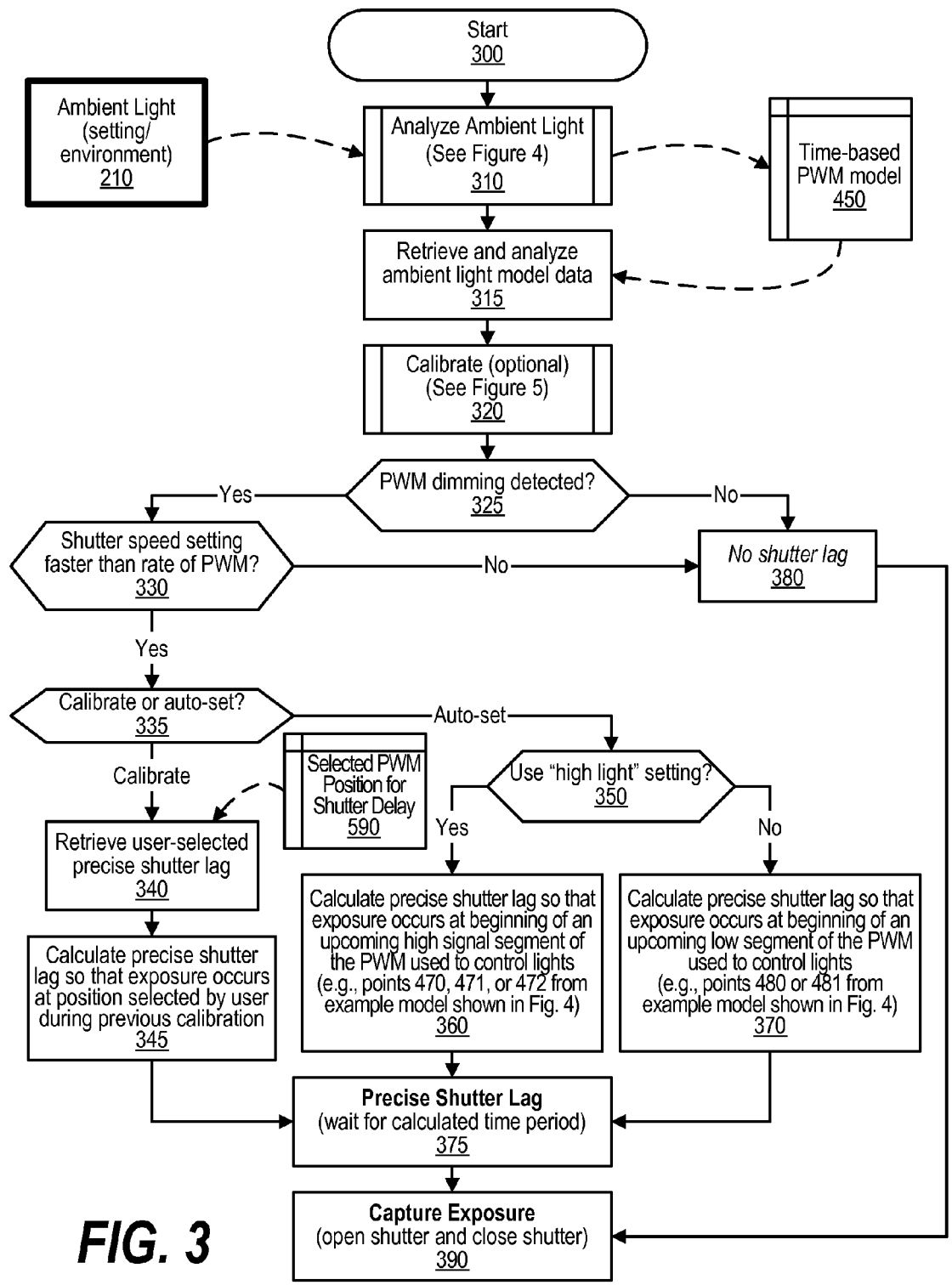
FIG. 3 is a flowchart showing steps performed to capture images in pulsating light conditions.

FIG. 3 is a flowchart showing steps performed to capture images in pulsating light conditions. Processing commences at 300 whereupon, at predefined process 310, the ambient light in the physical environment are analyzed (see FIG. 4 and corresponding text for processing details). During the analysis, data is collected pertaining to the ambient light conditions and, if pulse-width modulation (PWM) lighting is detected, a PWM timing model is generated and stored in memory area 450 (see FIG. 4, element 460, for an example of a PWM timing model).

At step 315, the PWM timing model stored in memory area 450 is retrieved and the ambient light data is analyzed. At predefined process 320, the user can optionally select one of a multitude of sample images taken in the ambient light with each of the sample images taken at different points in the PWM timing model with the selected image being used to calculate how far along the high or low signal segment actual exposures should be taken based on the image characteristics desired by the user. As described above, automatic settings are also provided so that the user can select to have images taken at a "high light" setting (at the beginning of a high signal segment in the PWM timing model) or at a "low light" setting (at the beginning of a low signal segment in the PWM timing model).

A decision is made as to whether the dSLR has detected that the ambient light of the physical environment is controlled using PWM (decision 325). Regardless of whether the dSLR detects that ambient light of the physical environment is controlled using PWM, the intensity of the ambient light is taken into account by the user (e.g., a photographer) in order to set the camera settings such as the shutter speed, lens aperture, and sensor sensitivity (ISO speed). Returning to decision 325, if PWM controlled lighting is detected, then decision 325 branches to the "yes" branch. A decision is then made as to whether the shutter speed setting of the dSLR is faster than the rate of modulation in the PWM ambient lighting (decision 330). If the shutter speed setting of the dSLR is faster than the rate of modulation in the PWM ambient lighting, then decision 330 branches to the "yes" branch to take an exposure that takes the PWM ambient lighting into account.

A decision is made as to whether the user has calibrated the dSLR by selecting one of a multitude of exposures taken in the ambient light as a model or if the user has selected an automatic setting (auto-set) of the dSLR (decision 335). If the user has calibrated the dSLR, then decision 335 branches to the "calibrate" branch whereupon, at step 340, the system retrieves the user-selected precise shutter lag based on the sample image that was selected by the user during the process shown in FIG. 5. The selected PWM position on the PWM timing model corresponding to the user's desired shutter lag is retrieved from memory area 590. At step 345, the system calculates the precise shutter lag so that the exposure that is about to be taken will occur at the position in the PWM timing model that corresponds to the position of the sample image that the user selected during calibration processing (see FIG. 5 and corresponding text for calibration processing details). At step 375, the precise shutter lag is performed. The precise shutter lag is a time delay so that the shutter of the dSLR is opened after the calculated camera shutter lag has expired. At step 390, when the camera shutter is opened, the camera sensor is exposed and results in a captured exposure in the same PWM lighting conditions as were present during the taking of the sample image.

Figure 4:
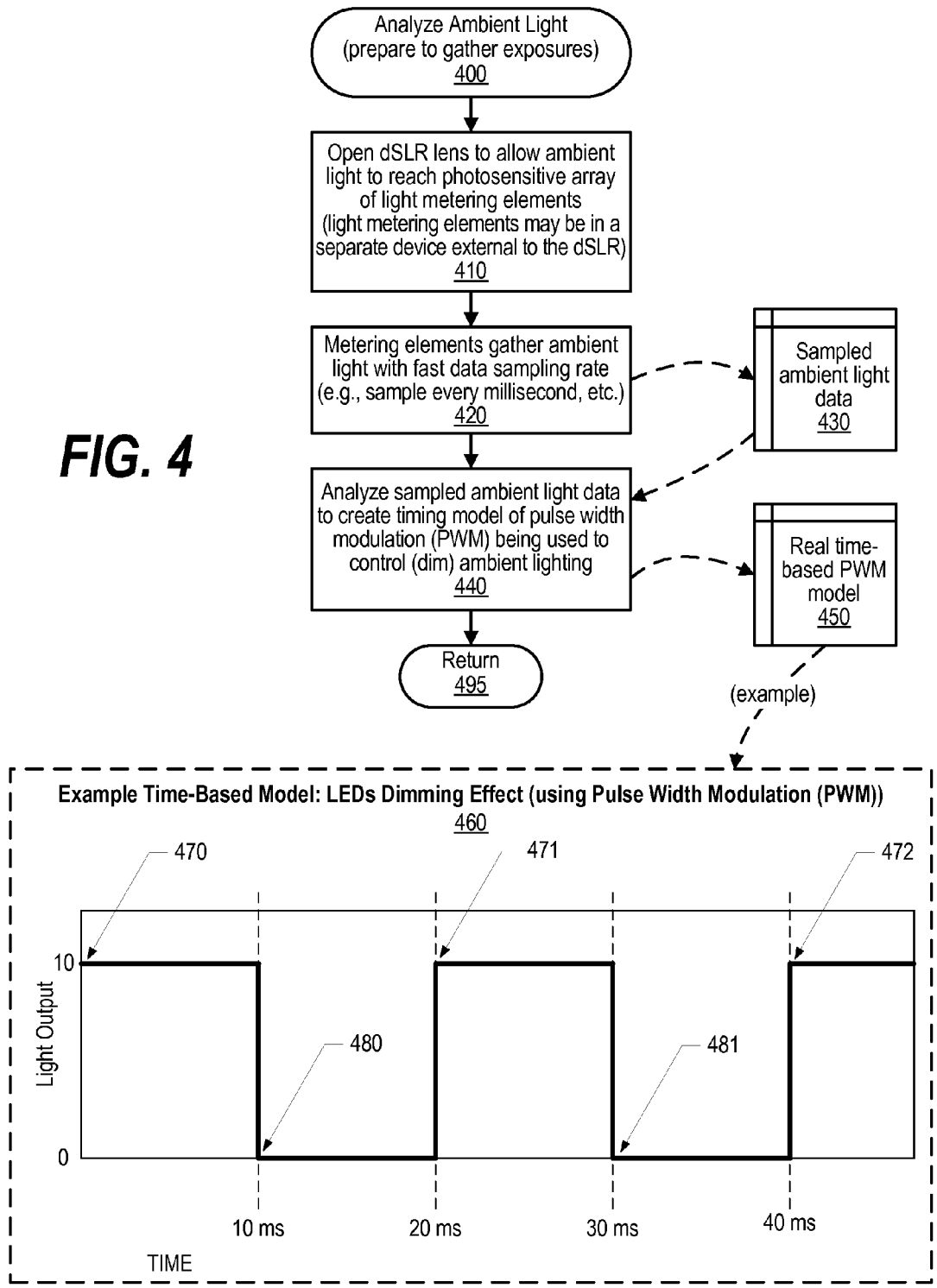
FIG. 4 is a flowchart showing steps performed to analyze ambient light conditions where pulsating lighting is utilized.

Returning to decision 335, if the user has selected an automatic setting, then decision 335 branches to the "auto-set" branch. A decision is made as to whether the "high light" or the "low light" automatic setting has been selected by the user (decision 350). If the "high light" setting has been selected, then decision 350 branches to the "yes" branch whereupon, at step 360, the system calculates a precise shutter lag so that the upcoming exposure occurs at the beginning of an upcoming high signal segment of the PWM. For an example of such high signal segment points, see points 470, 471, and 472 in timing model 460 that is shown in FIG. 4. On the other hand, if the "low light" setting has been selected, then decision 350 branches to the "no" branch whereupon, at step 370, the system calculates a precise shutter lag so that the upcoming exposure occurs at the beginning of an upcoming low signal segment of the PWM. For an example of such low signal segment points, see points 480 and 480 in timing model 460 that is shown in FIG. 4. At step 375, the precise shutter lag is performed. The precise shutter lag is a time delay so that the shutter of the dSLR is opened after the calculated camera shutter lag has expired. At step 390, when the camera shutter is opened, the camera sensor is exposed and results in a captured exposure in the same PWM lighting conditions as were present during the taking of the sample image.

Returning to decisions 325 and 330, if PWM controlled ambient lighting was not detected (decision 325 branching to the "no" branch) or if the shutter speed is slower than the modulation rate of the detected PWM in the PWM timing model for the ambient lighting conditions (decision 330 branching to the "no" branch), then, at step 380, no shutter lag is used as a shutter lag in these situations is not needed and, at step 390, the exposure is captured by opening the shutter and then closing the shutter.

FIG. 4 is a flowchart showing steps performed to analyze ambient light conditions where pulsed lighting is utilized. The ambient light analysis routine commences at 400 with the routine having been called at predefined process 310 shown in FIG. 3. At step 410, the system allows ambient light to reach a photosensitive array of light metering elements included in the dSLR. At step 420, the photosensitive array of light metering elements gather ambient light using a fast data sampling rate (e.g., sampling every millisecond, etc.). The sampled ambient light data is stored in memory area 430. In one embodiment, the photosensitive array of light metering elements is incorporated in the dSLR and is accessed by a routine that opens the shutter and allows the ambient light to reach the photosensitive array of light metering elements. In another embodiment, the photosensitive array of light metering elements is a separate sensor array, such as an external device, that supplies the sampled ambient light data to the dSLR and to the processes that provide a shutter lag so that the lens is exposed at a desired position in the PWM timing model.

At step 440, the process analyzes the sampled ambient light data stored in memory area 430 in order to create a PWM timing model of the pulse width modulation (PWM) that is currently being used to control (dim) the ambient lighting in the physical environment where the dSLR is operating. The PWM timing model is stored in memory area 450 for future use by the processes shown in both FIG. 3 and FIG. 5 to identify positions on the PWM timing model where exposures are to be taken (FIG. 3) and where a selected image used in calibration was taken (FIG. 5). Processing then returns to the calling routine (see FIG. 3) at 494.

An example of a PWM timing model corresponding to ambient light of a physical environment is shown at 460. The y-axis shows a light output level and the x-axis shows various points in time. In the example shown, the high signal segment has a value of ten units and the low signal segment has a value of zero units (e.g., the pulsing being between "ten" and off, etc.). In the example, the high signal segment and the low signal segment are both ten milliseconds in duration. If the light control (e.g., a dimmer, etc.) is set to a "brighter" setting then, one way the brighter light output can be achieved is by lengthening the high signal segments and/or shortening the low signal segments. Conversely, to provide a "dimmer" setting, the dimmer light output can be achieved is by shortening the high signal segments and/or lengthening the low signal segments. Points 470, 471, and 472 show the beginning points of high signal segments that might be used when the user has "auto-set" the dSLR to use a "high light" setting. Points 480 and 481 show the beginning points of low signal segments that might be used when the user has "auto-set" the dSLR to use a "low light" setting.

FIG. 5 is a flowchart showing steps performed to calibrate the camera based on the lighting conditions. Processing of the calibration routine commences at 500 whereupon, at step 510, a first position on the pulse-width modulation (PWM)

timing model is selected. At step 520, a sample exposure is taken using the dSLR at the selected position on the PWM timing model in the ambient light conditions of the physical environment. The position on the PWM timing model is retrieved from memory area 450 where the PWM timing model is stored.

Calibration images and data 525 include both sample images taken at step 520 as well as metadata regarding the sample images with the metadata stored in memory area 535 and indicating where in the PWM timing model each of the sample images was taken. A decision is made as to whether more sample exposures are to be taken (decision 540). In one embodiment, enough sample images are taken to show the characteristics of images taken throughout the various positions in the high and low signal segments in the PWM timing model. If more exposures are being captured, then decision 540 branches to the "yes" branch whereupon, at step 545, the position along the PWM timing model is incremented (e.g., by one millisecond, etc.) and processing loops back to select the new position and capture/store an image at the next position. This looping continues until no more exposures need to be captured, at which point decision 540 branches to the "no" branch.

At step 550, the sample exposures are displayed to a user of the system (e.g., a photographer, etc.). At step 560, the system prompts the user to select a sample image that has the characteristics desired by the user. At step 570, the system receives a sample image selection from the user. At step 575, the system retrieves the position of the selected image on the PWM timing model (e.g., two milliseconds after the beginning of a high signal segment, etc.). At step 580, the position retrieved at step 575 is retained in memory area 590 for future retrieval and use when images are being captured so that the precise shutter lag being used during collection of future images opens the shutter at the same place on the PWM timing model as the sample image selected by the user. Processing then returns to the calling routine (see FIG. 3) at 595.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system to adjust a camera shutter lag, the method comprising:
    collecting data corresponding to ambient light of a physical environment, wherein the ambient light is controlled using pulse-width modulation (PWM) and wherein the PWM corresponds to a PWM timing model;
    receiving an exposure request;
    in response to receiving the exposure request:
        calculating a camera shutter lag, using the PWM timing model, based on a future point in time at which the ambient light of the physical environment is predicted to be at a selected light output level; and
        opening a shutter of the camera after the calculated camera shutter lag has expired, the opening causing an exposure of a sensor that results in a captured exposure.

2. The method of claim 1 further comprising:
    analyzing the ambient light of the physical environment prior to receiving the exposure request.

3. The method of claim 2 wherein the analyzing further comprises:
    allowing the ambient light to reach a photosensitive array of light metering elements;
    collecting the ambient light data by sampling the ambient light reaching the photosensitive array of light metering elements; and
    creating the PWM timing model based on the collected ambient light data.

4. The method of claim 1 further comprising:
    detecting that the ambient light of the physical environment is controlled using the PWM.

5. The method of claim 1 further comprising:
    prior to calculating the camera shutter lag, calibrating based on the PWM controlled ambient lighting, the calibrating comprising:
        creating a plurality of sample exposures, wherein each of the sample exposures is taken at a different point in the PWM timing model.

6. The method of claim 5 further comprising:
    displaying the plurality of sample exposures to a user;
    receiving a selection from the user wherein the selection corresponds to a selected one of the sample exposures;
    identifying a selected sample light output level in the PWM timing model, wherein the selected sample light output level corresponds to selected sample exposure; and
    setting the selected light output level to the selected sample light output level.

7. The method of claim 1 further comprising:
setting the selected light output level to a beginning point of an upcoming high signal segment of the PWM timing model.
8. The method of claim 7 further comprising:
receiving an auto-set request from a user, wherein the auto-set request corresponds to a "high light" setting.
9. The method of claim 1 further comprising:
setting the selected light output level to a beginning point of an upcoming low signal segment of the PWM timing model.
10. The method of claim 9 further comprising:
receiving an auto-set request from a user, wherein the auto-set request corresponds to a "low light" setting.

* * * * *